US007204086B2

(12) United States Patent
Cook et al.

(10) Patent No.: US 7,204,086 B2
(45) **Date of Patent: *Apr. 17, 2007**

(54) METHOD OF OPERATING A HYDRAULIC SYSTEM FOR A LOADER MACHINE

(75) Inventors: David A. Cook, Cheadle (GB); Ben Covell, Staffordshire (GB)

(73) Assignee: J.C Bamford Excavators Limited, Staffordshire (GB)

( * ) Notice: Subject to any disclaimer, the term of this patent is extended or adjusted under 35 U.S.C. 154(b) by 87 days.

This patent is subject to a terminal disclaimer.

(21) Appl. No.: 10/885,325

(22) Filed: Jul. 6, 2004

(65) Prior Publication Data

US 2005/0011189 A1 Jan. 20, 2005

Related U.S. Application Data

(63) Continuation-in-part of application No. 09/866,311, filed on May 25, 2001.

(30) Foreign Application Priority Data

May 25, 2000 (GB) ................................ 0012602.9

(51) Int. Cl.
*F16D 31/02* (2006.01)

(52) U.S. Cl. ........................................................ 60/469

(58) Field of Classification Search .................. 60/413, 60/467, 469; 91/420

See application file for complete search history.

(56) References Cited

U.S. PATENT DOCUMENTS

| | | | |
|---|---|---|---|
| 4,658,970 A | 4/1987 | Oliphant | |
| 5,034,892 A | 7/1991 | Saotome | |
| 5,195,864 A | 3/1993 | Drake et al. | |
| 5,513,491 A | 5/1996 | Broenner et al. | |
| 6,357,230 B1 * | 3/2002 | A'Hearn et al. | 60/413 |

FOREIGN PATENT DOCUMENTS

| | | |
|---|---|---|
| DE | 3909205 | 5/1990 |
| DE | 19913784 | 5/2000 |
| EP | 0388641 | 9/1990 |
| EP | 0482248 | 4/1992 |
| EP | 1003939 | 5/2000 |
| JP | 58121305 | 7/1983 |
| JP | 63265023 | 11/1988 |
| JP | 05163745 | 6/1993 |
| JP | 09078633 | 3/1997 |
| WO | WO 99/07950 | 2/1999 |

* cited by examiner

*Primary Examiner*—F. Daniel Lopez
(74) *Attorney, Agent, or Firm*—Marshall, Gerstein & Borun LLP

(57) ABSTRACT

A method of operating a hydraulic system of a loader arm carrying a working implement, the system having a ride improvement system and a selection valve connected to first and second chambers of a ram which operates the loader arm. A check valve assembly is provided, with the check valve assembly being responsive to pressure changes in the second chamber. The check valve assembly, when closed, prevents fluid from passing between the first chamber to the selection valve. Means are provided communicating the fluid pressure in the second chamber to the check valve, with the means responsive to pressure changes in the second chamber to open the check valve. The selection valve is operable to raise the loader arm with the system arranged to permit passage of fluid between the first chamber and the accumulator while permitting fluid to pass from the second chamber to a low pressure region.

6 Claims, 7 Drawing Sheets

METHOD OF OPERATING A HYDRAULIC SYSTEM FOR A LOADER MACHINE

BACKGROUND OF THE INVENTION

This invention relates to a method of operating a hydraulic system for a loading machine, such as a wheeled loader having a loader arm assembly which carries a working implement and in which the loader arm assembly is connected to the body and which is movable between raised and lowered positions by means of a hydraulic ram.

It is known to improve the ride of a wheeled loader by connecting an hydraulic accumulator into the hydraulic hose which feeds hydraulic fluid into said ram means to raise the loader arm assembly. As a result when the wheeled loader is travelling across a site, or when travelling along a road, the loader arm assembly is suspended in spring manner by the accumulator and so the wheeled loader is able to travel with less pitch and bounce than would otherwise have been the case.

However, such a ride improvement system has not been provided hitherto in a loader vehicle including a loader arm assembly connected at, or adjacent to, the rear end of the assembly to the body at, or adjacent to, the rear end of the body so that the loader arm assembly extends forwardly whereby, in a lowered position of the arm assembly, the working implement is disposed in front of the body, where such a vehicle is provided with a hose burst check valve.

According to at least one disclosed example of the present invention, we provide a method of operating a hydraulic system of a loader machine, the loader machine having a loader arm assembly connected to a body so that in a lowered position of the loader arm assembly, a working implement carried at an outer end of the loader arm assembly is disposed in front of the body, and which loader arm assembly is movable between raised and lowered positions by means of a hydraulic ram of the hydraulic system, the hydraulic system further including a ride improvement system including a hydraulic accumulator which is connected to the hydraulic ram, and a selection valve connected to each of a first and second chamber of the hydraulic ram, and a check valve assembly connected between the first chamber and the selection valve such that the check valve, when in a closed condition, prevents fluid under pressure passing from the first chamber to the selection valve, and the check valve assembly having hydraulic fluid responsive means responsive to hydraulic fluid pressure in the second chamber to move the check valve assembly to an open condition, and there being means to connect the hydraulic fluid pressure in the second chamber to the check valve assembly, the method including operating the selection valve to raise the loader arm assembly by feeding fluid under pressure to one chamber of the ram and to receive fluid at a lower pressure from the second chamber of the ram, or to lower the loader arm assembly by feeding fluid under pressure to the second chamber of the ram and to receive fluid at a lower pressure from the first chamber of the ram, and wherein the method includes operating the selection valve to raise or lower the loader arm assembly, and when the selection valve means is operated to raise the loader arm assembly, permitting the passage of hydraulic fluid between the first chamber of the hydraulic ram and the accumulator, and whilst permitting the passage of hydraulic fluid from the second chamber to a low pressure region.

Desirably, when the selection valve is operated to lower the loader arm assembly, the passage of hydraulic fluid from the second chamber to the low pressure region is prevented, and thus sufficient hydraulic pressure will be provided to the hydraulic pressure sensing means to open the check valve assembly and to permit fluid to pass from the first chamber of the ram, back to the selection valve.

If desired, the method may include moving a first control valve which is connected between the first chamber of the hydraulic ram and the hydraulic accumulator, between a first position in which the passage of hydraulic fluid between the first chamber of the hydraulic ram and the accumulator is permitted and a second position in which passage of hydraulic fluid to the accumulator is prevented. However in another arrangement, such a first control valve need not be provided, so that the ride improvement system is potentially permanently in an active condition.

The method includes moving a control valve which is connected between the second chamber and the low pressure region between a first position in which passage of hydraulic fluid therethrough to the low pressure region is permitted, in which condition the loader arm assembly may be raised, and a second position in which the flow of hydraulic fluid to the low pressure region is prevented, so that the loader arm assembly may be lowered.

Although the step of moving the control valve which is connected between the second chamber and the low pressure region between its first and second positions may be carried out purely manually, in a preferred arrangement the selection valve is provided with a switch to sense when the selection valve is operated to lower the loader arm assembly, and wherein the method includes sensing operation of the selection valve to lower the loader arm assembly, and moving at least the second control valve to the second position in response. Thus, in accordance with the disclosed example, the method step of moving the control valve to permit lowering of the loader arm assembly may be achieved automatically.

BRIEF DESCRIPTION OF THE DRAWINGS

Embodiments of the invention will now be described with reference to the accompanying drawings wherein.

Figure 1:
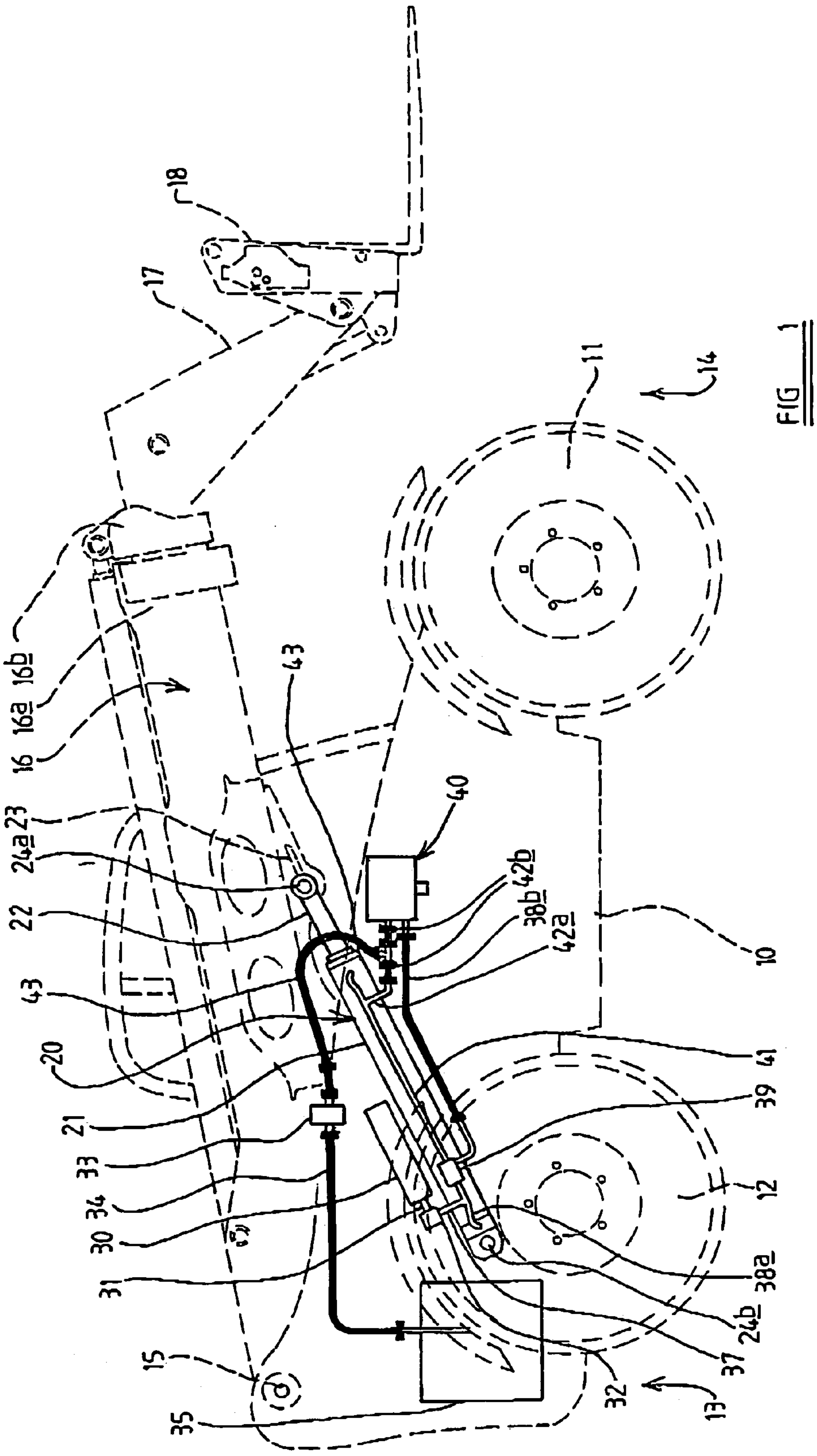
FIG. 1 is a side view of a vehicle according to the invention.

Referring to the drawings, a wheeled loader vehicle includes a body 10 supported, in conventional manner, on two pairs of front and rear wheels 11, 12 each of which is steerable and each of which is driven by a suitable transmission and differential means from an engine which may be disposed as desired on the vehicle. The body 10 has a rear end 13 and a front end 14. A loader arm assembly 16, at a position adjacent its rear end, is pivotally mounted to the body 10 adjacent the rear end 13 of the body, about an axis 15. The loader arm assembly 16 in the present example, is a two part boom having an outer part 16*a,* within which is telescoped an inner part 16*b* and which parts are slidable relative to each other by hydraulic ram means so as to provide an extendible loader arm assembly. If desired the vehicle may have a two or more part boom or an unextendible single part boom.

At the front end of the boom assembly 16 is a downwardly extending nose part 17 by which a working implement 18 is releasably carried in conventional manner. If desired, the working implement 18 may be a pair of lifting tines as shown or may be a bucket or any other suitable working implement.

The loader arm assembly may be connected to the body at or adjacent the rear thereof, by any suitable pivot means disposed at or adjacent the rear of the loader arm assembly.

The loader arm assembly 16 is pivotable about the axis 15 between raised and lowered positions. In the lowered position working implement 18 is disposed in front of the vehicle front end 14. The loader arm assembly 16 is movable between said raised and lowered positions by a ram assembly 20, which in the present example includes a single ram. The ram assembly 20, in conventional manner, includes a cylinder part 21 and a piston rod 22. The piston rod 22 is connected at one end to a bracket 23 depending downwardly from the underside of the part 16*a* of the lowered arm assembly by means of a pivot pin 24*a* whilst the cylinder 21 is connected, at its lower end, by a pivot pin 24*b* to a part of the body 10. Obviously extension and retraction of the piston rod 22 from the cylinder 21 causes pivotal raising and lowering of the arm assembly 16.

Within the cylinder 21 is a first chamber 25, on one side of the piston 27, which is of cylindrical configuration and a second chamber 26 on the opposite side of the piston 27, see FIGS. 2 to 5, to the first chamber 25 and which is of annular configuration in cross section. Mounted on the cylinder 21 is a conventional accumulator means 30 made of, in the present example, steel and connected by a pipe 31 to a first control valve 32. A second control valve 33 is connected by a line 34 including flexible hoses and/or rigid pipes to an hydraulic reservoir or other low pressure area 35.

Each control valve 32, 33 is an electrically operated solenoid valve and which is movable between a first or “at rest” position in which passage of fluid is prevented in one direction of the valve 32 and in both directions in the valve 33 and a second position in which passage of fluid is permitted. Both control valves 32, 33 are normally spring biased by a spring means 36 to the position in which flow of fluid is prevented as illustrated in FIG. 2 and FIG. 3.

A line 38, including a rigid pipe 38*a* and a flexible line 38*b,* connects the first chamber 25 of the ram 20 to a first port 40*a* of a selection valve 40 via a hose burst check valve 39. The first control valve 32 is connected by a line 37, including a rigid pipe, to the line 38 between ram chamber 25 and the hose burst check valve 39. The hose burst check valve 39 is a pilot valve that is normally maintained closed in the direction to prevent flow of fluid under pressure from the chamber 25 to the valve 40 but it may be opened by supply of pilot pressure on line 41, including a rigid pipe, from a line 42, including a rigid pipe 42*a* and flexible hoses 42*b* which extends between a second port 40*b* of the selection valve 40 and the chamber 26 of the ram 20. The line 42 is connected by a line 43 to the second control valve 33.

Figure 2:
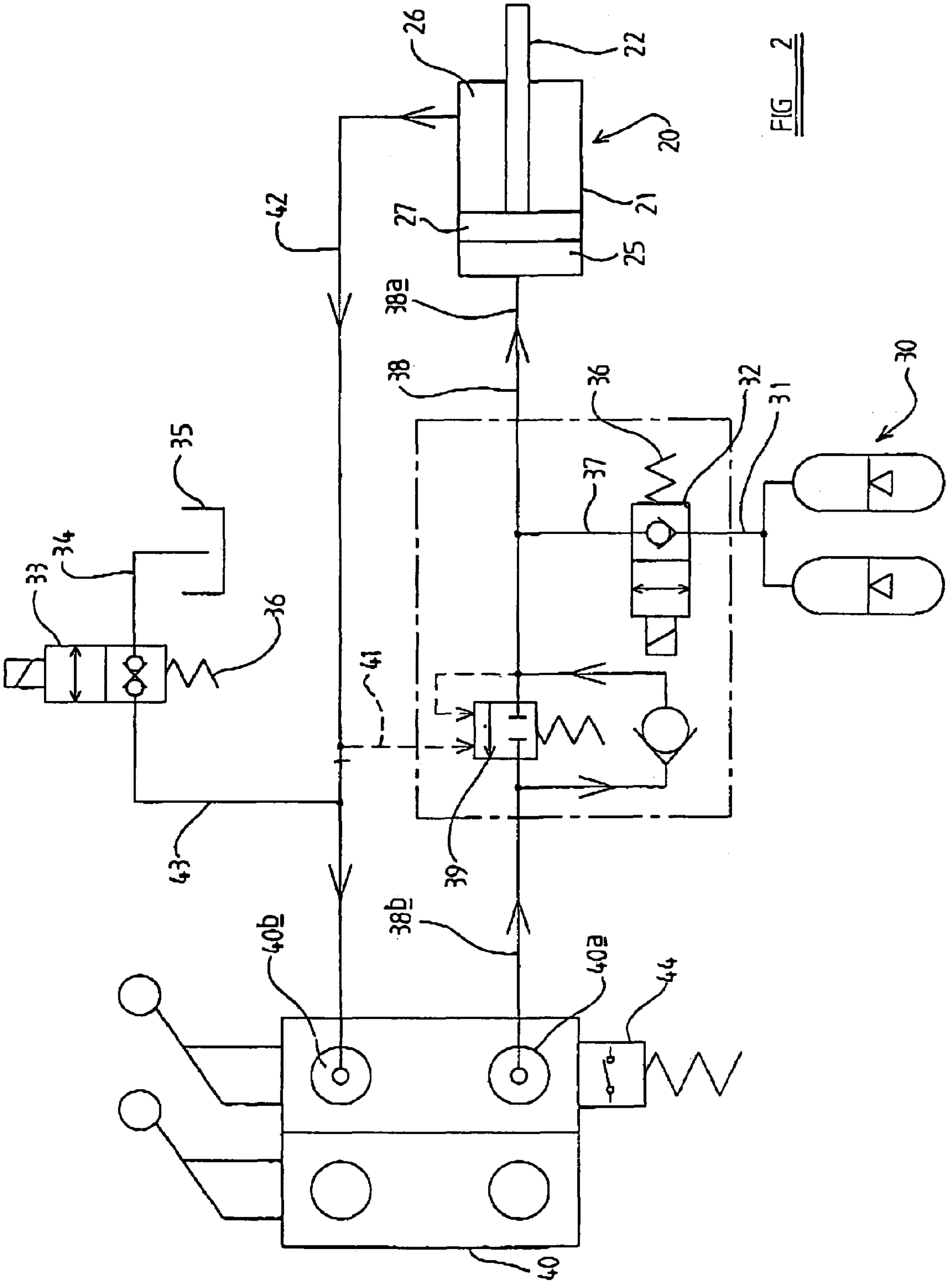
FIG. 2 is a diagrammatic circuit diagram showing the flow of hydraulic fluid and valve positions in normal operation of the vehicle during lifting of the arm.

In use, as best shown in FIG. 2, during normal operation, when it is desired to lift the arm, fluid under pressure is fed from the first port 40*a* of the selection valve 40 along the line 38 through the one-way check valve within the hose burst check valve 39. As boom suspension has not been selected there is no electrical supply to valves 32 and 33 and they remain in the normally closed position. As the telescopic boom 16 is raised, by the supply of fluid to the chamber 25, fluid under lower pressure is fed from the chamber 26 along line 42 into a port 40*b* of the selection valve 40. The valve 33, of course, being, like the valve 32, maintained in the position shown in FIG. 2 to prevent flow of fluid therethrough by virtue of no electrical supply being supplied to the solenoid thereof.

Figure 3:
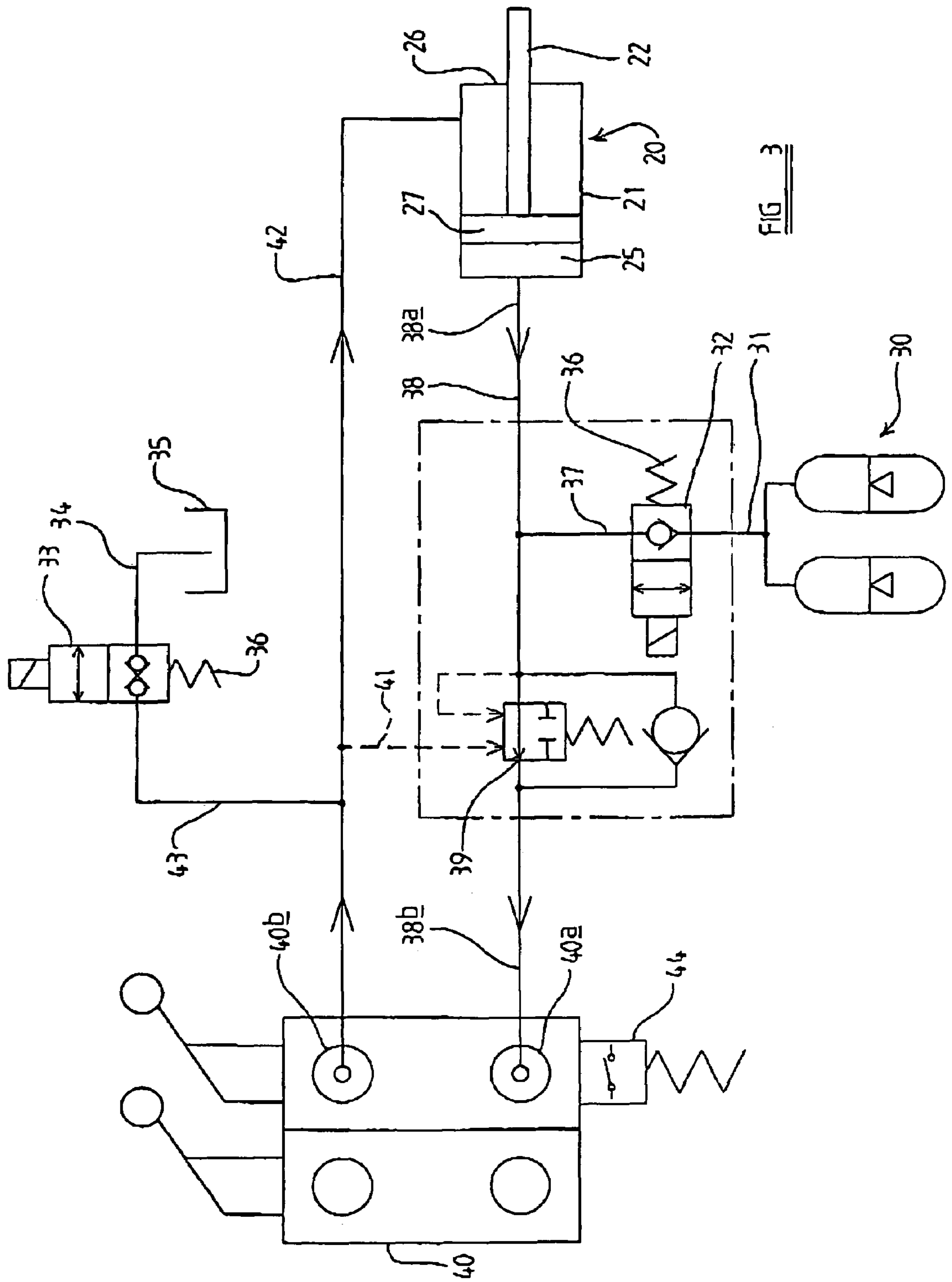
FIG. 3 is a view similar to that of FIG. 2 but showing normal operation during lowering of the arm.

Referring now to FIG. 3, when it is desired to lower the loader arm assembly the valve 40 is actuated to feed fluid under pressure through port 40*b* along line 42 into the chamber 26 and thus fluid under lower pressure is fed from chamber 25 along line 38 through hose burst check valve 39 which is maintained in an open position by virtue of supply of pilot pressure on line 41 which extends from line 42.

Figure 4:
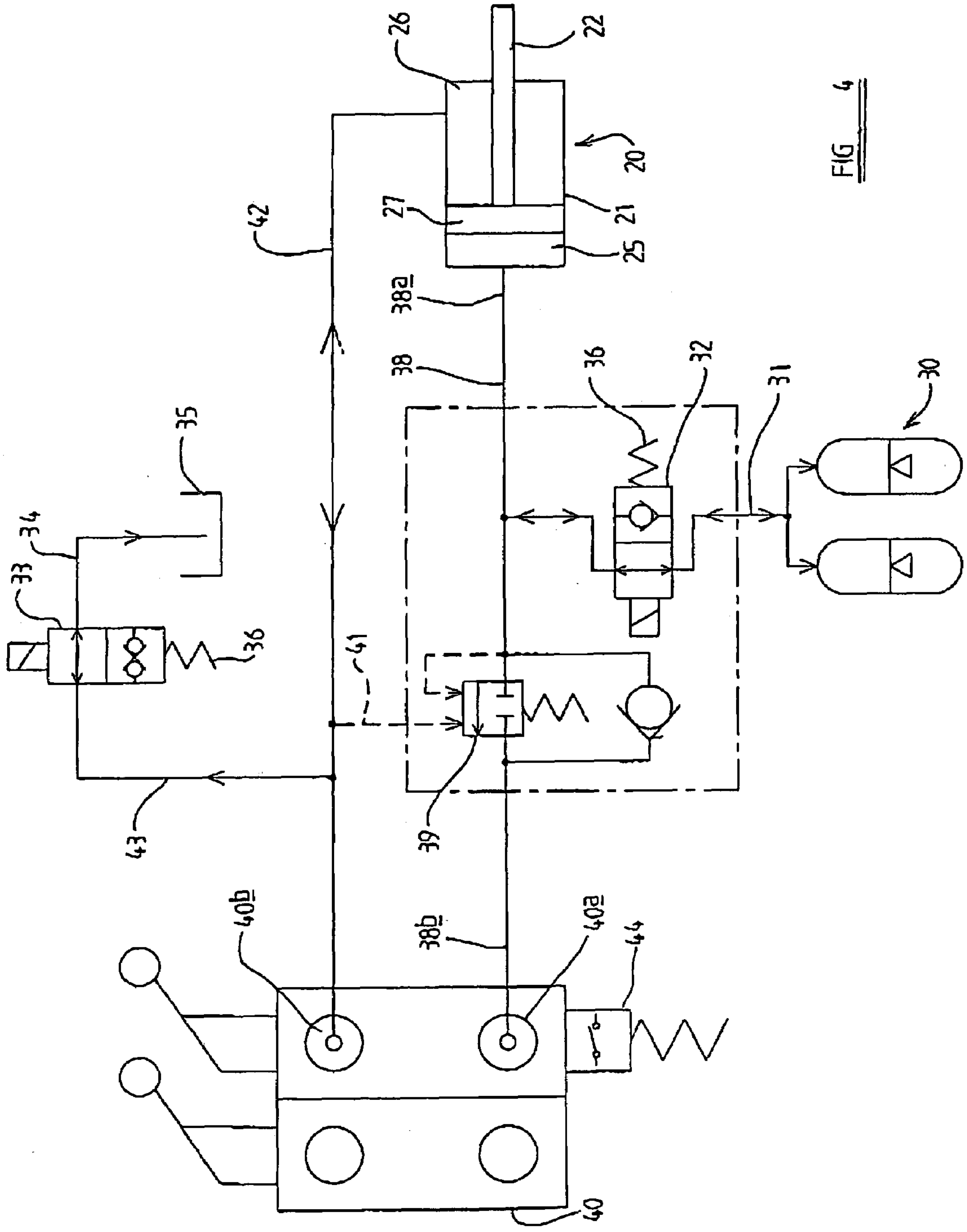
FIG. 4 is a view similar to that of FIG. 2 but showing a travel position of the vehicle with the ride improvement means engaged.
Figure 5:
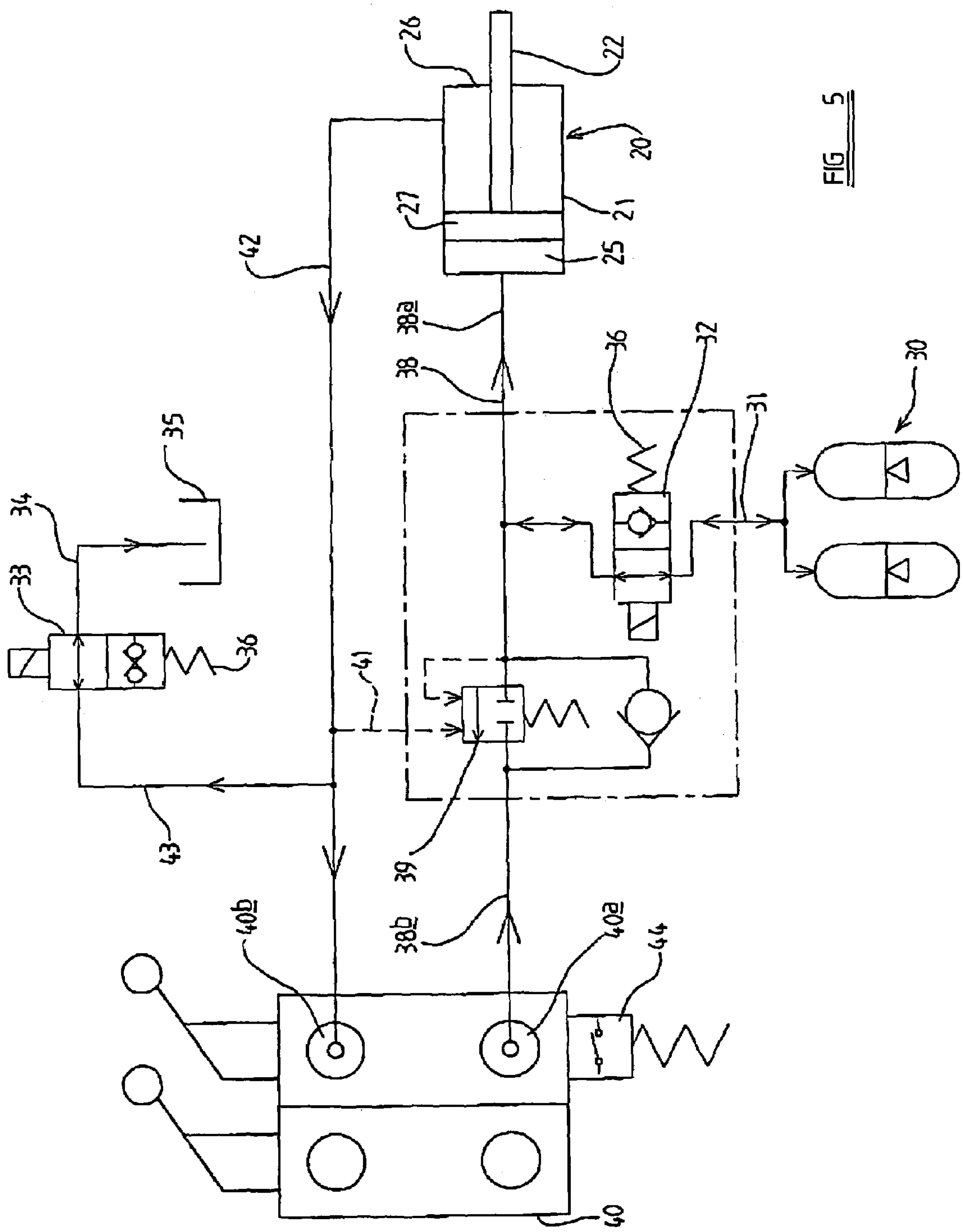
FIG. 5 is a view similar to that of FIG. 4 but showing a boom lift position and ride improvement means engaged.
Figure 6:
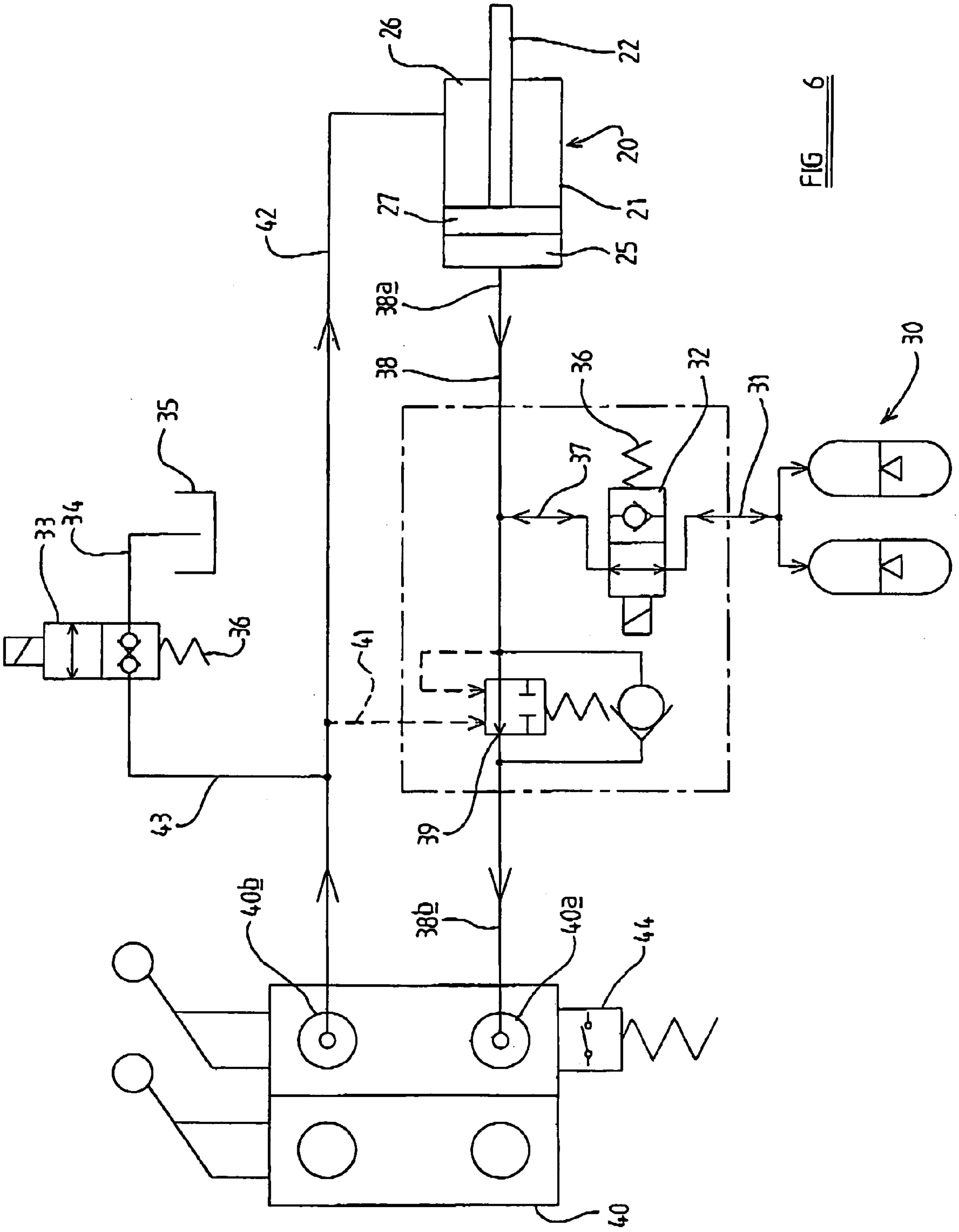
FIG. 6 is a view similar to that of FIG. 4 but showing flow of fluid in a boom lower position with the ride improvement means engaged.

Referring now to FIG. 4, when it is desired to operate the ride improvement means i.e. boom suspension means the system is activated by operation of a suitable electric control so that electrical supply is provided to the valves 32, 33 to move them from the positions shown FIGS. 2 and 3 to the positions shown in FIGS. 4 to 6 in which passage of hydraulic fluid is permitted.

In this position fluid can flow both to the accumulator 30 and also to the reservoir 35 in accordance with the external forces imposed on the piston 27 to displace fluid to or from chambers 25, 26. Such a condition is shown in FIG. 4. As a result the loader arm is supported by the action of the accumulator on the hydraulic fluid and it is, in effect, sprung.

Referring now to FIG. 5, when it is desired to raise the loader arm assembly whilst the ride improvement means is engaged, the valve 40 is actuated to feed fluid from port 40*a* under pressure along line 38 into the chamber 25 whilst fluid from the chamber 26 passes along the line 42 back to the valve 40. At the same time the suspension of the arm assembly is suspended by the accumulator 30 as described hereinbefore in connection with the FIG. 4.

Referring now to FIG. 6, when it is desired to lower the boom whilst the ride improvement means is engaged, the actuation of the valve 40 to raise pressure at port 40*b,* by virtue of switch 44, has the effect of collapsing the electrical signal to valve 33 which becomes closed and so allows pressure to be raised in line 42 which feeds fluid under pressure to chamber 26, whilst fluid in chamber 25 is fed via line 38 through the hose burst check valve 39 to the port 40*a* of the valve 40. The hose burst check valve 39 is maintained open by pilot pressure fluid on line 41 which extends from line 42.

Whilst in this example the accumulator 30, valves 32, 33 and check valve 39 are all disposed on the cylinder 21, if desired one or more of these components may be positioned as desired and made of material as desired where permitted by local regulations.

Figure 7:
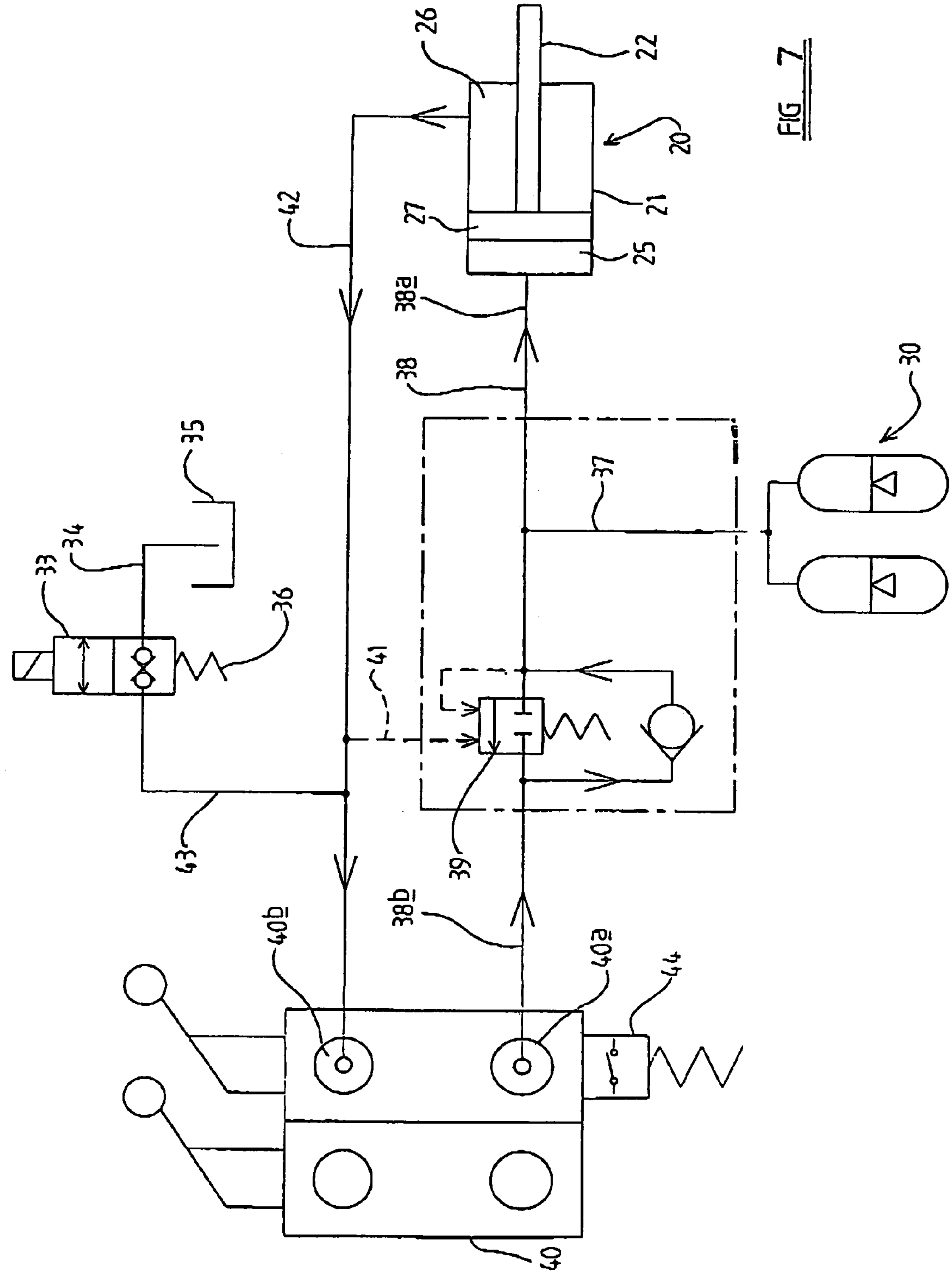
FIG. 7 is a diagrammatic circuit diagram of a second embodiment of the invention.

Referring now to FIG. 7 an alternative embodiment is illustrated. Similar parts to those shown in FIGS. 1 to 6 are indicated by the same reference numerals.

In this example, the first control valve indicated at 32 in the hydraulic system of the previous figures, is removed, and the accumulator 30 is connected by the rigid pipe 37 to the line 38 at a point between the hose burst check valve assembly 39 (or check valve assembly 39) and the ram assembly 20.

The loader vehicle operates similarly to the loader vehicle described with reference to the previous figures, to provide both ride improvement and hose burst protection, by the provision of the host burst protection or check valve assembly 39.

However, it will be appreciated that without the presence of the first control valve 32 which is moveable as described above to a second position to prevent the flow of hydraulic fluid to the accumulator 30, the ride improvement system is preferably arranged to be permanently "on" or active.

In a first active state, when the second control valve 33 is in the "at rest" or first position shown in FIG. 7, it will be appreciated that it is possible to raise the loader arm assembly 16 by operating the selection valve 40, to develop pressure in the lines 38*b* and 38 connected to the first chamber 25 of the ram assembly 20 with fluid expelled from second chamber 26 passing along line 42 back to the selection valve 40, the hose burst protection valve assembly 39 maintaining the condition shown in FIG. 7 to provide protection in the event of a hose burst in the line between the hose burst protection vale 39 and the selection valve 40.

Moreover in the first active state, the loader arm assembly 16 may be lowered by operating the selection valve 40, to develop pressure in the line 42 to and in the second chamber 26 of the ram assembly 20. Pressure may be thus developed in the line 42 and second chamber 26 because the second control valve 33 is in its first position i.e. closed to prevent fluid passing from the line 42 to the low pressure region 35. Thus a pilot pressure is transmitted, along line 41, to the hose burst protection or check valve assembly 39 which thus moves to the condition indicated in FIG. 3, so that fluid expelled from the first chamber 25 may pass through the hose burst protection or check valve assembly 39 back to and through the selection valve 40.

In a second active state, whilst the line 38 between the hose burst protection or check valve assembly 39 and the ram assembly 20 is connected to the accumulator 30 by virtue of the absence of the first control valve 32, the second control valve 33 is moved to second position shown in FIG. 4 when fluid flow from the line 42 between the second chamber 25 of the ram assembly 40 and the selection valve 40, through the second control valve 33 to the low pressure region 35, is permitted. In this state, although ride improvement is provided as the accumulator 30 is still connected to the line 38 between the host burst protection or check valve assembly 39, and the first chamber 25 of the ram assembly 20, and the loader arm may be lifted by applying pressure to lines 38*b*/38. However, fluid expelled from the second chamber 26 of the ram assembly 20 may pass to the low pressure region 35 through the second control valve 33.

It will be appreciated that the primary role of the second control valve 33 when in its first "at rest" position is to prevent the flow of pressurized fluid from the line 42 connected to the second chamber 26 of the ram assembly 20, to the low pressure region 35, although the particular second control valve 33 shown in the drawings prevents fluid flow in both directions through the valve 33.

In the embodiment of FIG. 7 preferably the second control valve 33 is moved between its first and second positions, e.g. by the operation of a solenoid or other electrically operated actuator, under the control of a manually actuated switch, although preferably under the automatic control of the switch 44 provided on the selector valve 40, to switch the control valve 33 to its first position so that fluid is prevented from passing to the low pressure region 35, whenever it is desired to lower the loader arm. Desirably in this embodiment, the second control valve 33 is "at rest" in its second position when fluid flow through the control valve 33 is permitted and an electrical signal is supplied to the control valve 33 to move the control valve to its first position to prevent fluid flow at least to the low pressure region 35, when the selector valve 40 is operated such as to lower the loader arm.

In each of the embodiments described, by virtue of either the one way check valve within the first control valve 32 (in the embodiments shown in FIGS. 1 to 6) or the direct connection between the accumulator 30 and the line 38 between the hose burst protection or check valve assembly 39 and the first chamber 25 of the ram assembly 20, the pressure in the accumulator 30 can never exceed the pressure in first chamber 25. When the first control valve 32 where provided, is in its second position as seen in FIGS. 4 and 5, or permanently in the FIG. 7 embodiment, the accumulator 30 will provide at least some ride improvement as the loader vehicle travels over the ground irrespective of the position of the second control valve 33, as movements of the loader arm at least downwardly will be damped by the action of the accumulator 30. In each embodiment, when the second chamber 26 of the ram 20 is connected to the low pressure region 35, when the second control valve 33 is in its second position, the ride improvement system will be fully active.

In each mode of operation described above, in the event of a host burst in the line 38*b* between the host burst protection of check valve assembly 39 and the selection valve 40 when highly pressurized, e.g. during lifting, or in the hose between where the second control valve 33 and the line 42 to the selection valve 40 are connected when highly pressurized, e.g. during lowering, the hose burst protection or check valve assembly 39 will be closed or close, to prevent the escape of pressurized fluid from the line 38*a* between the first chamber 25 and the hose burst protection or check valve assembly 39, so that the loader arm is prevented from collapsing and thus possible creating an unstable and possibly dangerous situation.

Although the invention has been described in relation to a wheeled loader vehicle, it will be appreciated that the invention may be applied to any other mobile machine requiring a ride improvement system for a loader arm. For example the invention may be applied to a tracked or partly tacked machine or vehicle, or to a mobile crane.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

The invention claimed is:

1. A method of operating a hydraulic system of a loader machine, the loader machine having a loader arm assembly connected to a body so that in a lowered position of the loader arm assembly, a working implement carried at an outer end of the loader arm assembly is disposed in front of the body, and which loader arm assembly is movable between raised and lowered positions by means of a hydraulic ram of the hydraulic system, the hydraulic system further including ride improvement system including a hydraulic accumulator which is connected to the hydraulic ram, a selection valve connected to each of a first and second chamber of the hydraulic ram, and a check valve assembly including a check valve, the check valve assembly connected between the first chamber and the selection valve such that the check valve, when in a closed condition, prevents fluid under pressure passing from the first chamber to the selection valve, and the check valve assembly having hydraulic fluid responsive means responsive to hydraulic fluid pressure in the second chamber to move the check valve assembly to an open condition, and there being means to connect the hydraulic fluid pressure in the second chamber to the check valve assembly, the method including:

operating the selection valve to raise the loader arm assembly by feeding fluid under pressure to one chamber of the ram and to receive fluid at a lower pressure from the second chamber of the ram, or to lower the loader arm assembly by feeding fluid under pressure to the second chamber of the ram and to receive fluid at a lower pressure front the first chamber of the ram, and when the selection valve means is operated to raise and lower the loader arm assembly, allowing free two-way communication between the first chamber of the hydraulic ram and the accumulator during raising and lowering.

2. A method according to claim 1 wherein when the selection valve is operated lower the loader arm assembly, the passage of hydraulic fluid from the second chamber to the low pressure region is prevented.

3. A method according to claim 2 wherein when the selection valve is operated to lower the loader and assembly, the hydraulic fluid responsive means responds to the hydraulic fluid pressure in the second chamber to move the check valve assembly to an open condition to permit fluid from the first chamber to pass back to the selection valve.

4. A method according to claim 1 wherein the method includes moving a first control valve which is connected between the first chamber of the hydraulic ram and the hydraulic accumulator, between a first position in which the passage of hydraulic fluid between the first chamber of the hydraulic ram and the accumulator is permitted and a second position in which passage of hydraulic fluid to the accumulator is prevented.

5. A method according to claim 1 wherein the method includes moving a second control valve which is connected between the second chamber and the low pressure region between a first position in which passage of hydraulic fluid therethrough to the low pressure region is permitted, and a second position in which the flow of hydraulic fluid to the low pressure region is prevented.

6. A method according to claim 5 wherein the selection valve is provided with a switch to sense when the selection valve is operated to lower the loader arm assembly, and wherein the method includes sensing operation of the selection valve to lower the loader arm assembly, and moving at least the second control valve to the second position in response.

* * * * *

UNITED STATES PATENT AND TRADEMARK OFFICE

CERTIFICATE OF CORRECTION

PATENT NO. : 7,204,086 B2
APPLICATION NO. : 10/885325
DATED : April 17, 2007
INVENTOR(S) : David A. Cook et al.

It is certified that error appears in the above-identified patent and that said Letters Patent is hereby corrected as shown below:

On the Title Page:

Item (75), 1st named Inventor's city residence, "Cheadle" should be -- Staffordshire --.

In the Claims:

At Column 6, line 59, "including ride" should be -- including a ride --.

At Column 7, line 12, "pressure front" should be -- pressure from --.

At Column 7, line 19, "operated lower" should be -- operated to lower --.

At Column 7, line 23, "loader and" should be -- loader arm --.

Signed and Sealed this

Twenty-first Day of July, 2009

JOHN DOLL
*Acting Director of the United States Patent and Trademark Office*